the Trost mill at minus ten degrees Fahrenheit. An air pressure of 80 to 150 pounds per square inch is used to make each of the aqueous opposing streams.

United States Patent Office 3,214,384
Patented Oct. 26, 1965

3,214,384
METHOD OF PREPARING A COLLOIDAL
SOLUTION OF IODINE
Wilbert Moody Wilson, Morristown, N.J., assignor to George W. Helme Company, Helmetta, N.J.
No Drawing. Filed May 2, 1963, Ser. No. 277,476
1 Claim. (Cl. 252—314)

This invention relates to a new method of making colloidal iodine as well as to the product itself.

It is an object of this invention to prepare an aqueous colloidal solution of iodine wherein the colloidal iodine is in a suspensoid form and functions as a reservoir of iodine in true aqueous solution as the iodine is depleted from solution.

It is another object to provide a colloidal solution of iodine wherein a protective colloid is added to maintain a suitable quality of reserve colloidal iodine to effect controlled solubility of iodine into true solution.

It is another object to provide an aqueous colloidal suspensoid-solution mixture of iodine wherein the colloidal suspensoid iodine is uniformly distributed throughout the aqueous solution of molecular or dissolved iodine.

These and other objects and purposes of this invention will become readily apparent upon reading the following descriptive disclosure.

The colloidal iodine of this invention is an aqueous solution of colloidal iodine having a protective colloid therein. Such a solution releases colloidal iodine from colloidal solution into true solution as the iodine of the true solution is consumed. Thus the colloidal iodine functions as a reservoir for molecular iodine for the true aqueous solution, wherein iodine is but sparingly soluble.

According to this invention an aqueous colloidal solution of a protective colloidal is prepared. The protective colloid preferred is gum arabic. However, gum tragacanth and other natural gums of low iodine number are operable. Also synthetic gums such as water dispersible polyethylene oxide of low iodine number comparable to that of gum arabic are operable.

The amount of protective colloid added is from about one-tenth of one percent to about thirty-five percent.

The protective colloid solution is then mixed with crystalline iodine to prepare a slurry.

This slurry is then fed into a conventional Gem type Trost fluid energy jet mill wherein opposing streams of aqueous slurry and of recycle are brought into head on collision thereby fragmentizing the crystalline iodine into a colloidal condition.

A feature of this invention is the immersion of the Trost mill in a container and cooling it to from about zero degrees to about minus thirty degrees Fahrenheit.

The cooling effect is preferably done by use of crushed Dry Ice in the container and surrounding the jet mill. However, a solution of acetone and Dry Ice may be used. Also a suitable brine solution sufficiently cooled to zero degrees Fahrenheit or to as low as minus thirty degrees Fahrenheit are operable. Solutions of sodium chloride or of calcium chloride or other electrolytes may be used.

A preferred temperature of operation is minus ten degrees Fahrenheit.

In operating the Trost colloidal mill, the protective colloids prevent agglomeration of colloidal particles as they are formed and also prevent formation of ice crystals.

As an example, of this invention crystalline iodine particles of about twenty micron size and of over ninety-nine percent purity are added to an aqueous solution containing ten percent colloidal gum arabic to make a slurry. The slurry is fed into the inlet port of a suitably cooled Trost mill at minus ten degrees Fahrenheit. An air pressure of 80 to 150 pounds per square inch is used to make each of the aqueous opposing streams.

The collision of the super-cold opposing streams of iodine particles, that is the slurry stream and the recycle stream, produces a colloidal solution of from less than one micron to about 10 microns in size for the first pass. Recycle of this solution for a second pass through the mill reduces all the iodine to less than one micron size, for example, to from less than one-tenth micron to about one micron.

According to this invention the super-cooled iodine particles of for example, minus ten degrees Fahrenheit are very friable and thus they are easily dispersed into particles of a size within the colloidal range.

The size of the particles obtained is directly proportional to the energy or velocity of the aqueous streams. Thus the use of 150 pounds per square inch air pressure to make the opposing streams results in colloidal solutions of a very fine colloidal particle size range whereas the use of lower air pressures such as 80 pounds per square inch results in a colloidal range of relatively larger or coarser size.

The prepared colloidal suspensoid-solution of iodine may vary considerably in total iodine content but a preferred range is from a one percent over-all iodine content to a twenty percent over-all iodine content.

In the composition of this invention it is believed that the impact of the aqueous protective colloid solution containing slurry iodine against recycle aqueous solution produces colloidal protective particles intertwined with colloidal iodine particles. Thus the colloidal iodine of this invention is believed to be modified by the colloidal protective colloid to give an over-all novel structure wherein the iodine transitional release from the colloidal iodine state to the water soluble iodine state is controlled by the presence of protective colloid.

This invention has been described by means of several embodiments thereof but it is not limited to these embodiments as it is of greater scope.

I claim:

The method of preparing a colloidal solution of iodine of from one to about twenty percent iodine wherein the colloidal iodine is a reservoir for solution iodine comprising dissolving a protective colloid selected from the group consisting of gum arabic, gum tragacanth and water dispersable polyethylene oxide in water to prepare a colloidal solution thereof, preparing a slurry of crystalline iodine and said protective colloid solution, introducing said slurry into a cold fluid energy mill to engage a velocity air stream thereof and colliding said aqueous slurry stream with aqueous recycle stream to produce a colloidal solution of iodine, the temperature of said mill being from about zero degrees to about minus thirty degrees Fahrenheit, the said protective colloid solution containing from about one-tenth of one percent to about thirty-five percent protective colloid and said velocity of the colliding jet streams being produced by air pressure of from about 80 to about 150 pounds per square inch.

References Cited by the Examiner

UNITED STATES PATENTS 1,866,923  7/32  Chandler _____ 252—313

OTHER REFERENCES

Chandler et al.: "Colloidal Iodine," Journal of Physical Chemistry, Vol. 31, July 1927, pp. 1091–1096.

JULIUS GREENWALD, *Primary Examiner.*